United States Patent [19]

LeBoeuf

[11] 4,215,506
[45] Aug. 5, 1980

[54] TROLLING LURE AND METHOD OF MAKING SAME

[76] Inventor: Kenneth P. LeBoeuf, P.O. Box 78, Schriever, La. 70395

[21] Appl. No.: 25,868

[22] Filed: Apr. 2, 1979

[51] Int. Cl.² ............................................. A01K 85/00
[52] U.S. Cl. .................................. 43/42.05; 43/42.28; 43/42.33; 43/42.35; 43/42.36; 43/42.53
[58] Field of Search ................. 43/42.05, 42.28, 42.32, 43/42.33, 42.36, 42.35, 42.58

[56] References Cited

U.S. PATENT DOCUMENTS

| | | | |
|---|---|---|---|
| 963,202 | 7/1910 | Bohannan | 43/42.35 |
| 1,612,264 | 12/1926 | Cressey | 43/42.28 |
| 2,237,534 | 4/1941 | van der Clute | 43/42.28 |
| 2,365,502 | 12/1944 | Weesner | 43/42.28 |
| 2,625,767 | 1/1953 | Pokras | 43/42.05 |
| 2,912,783 | 11/1959 | Marks | 43/42.28 |
| 3,360,882 | 1/1968 | Belokin, Jr. | 43/42.33 |
| 3,497,987 | 3/1970 | Perrin | 43/42.53 |
| 3,947,989 | 4/1976 | Bart | 43/42.33 |

*Primary Examiner*—Nicholas P. Godici
*Assistant Examiner*—K. Bradford Adolphson
*Attorney, Agent, or Firm*—Wilkinson, Mawhinney & Theibault

[57] ABSTRACT

A hollow body fishing lure that is constructed of a transparent molded plastic and is slidable on the attachment line. The lure has a pair of trailing skirt appendages made from thin plastic mirror film which feature squid tips and are secured to the lure body by a pair of wires in tie grooves. A trolling weight and spectra film are secured within the hollow body. A method of making the lure is also disclosed.

8 Claims, 8 Drawing Figures

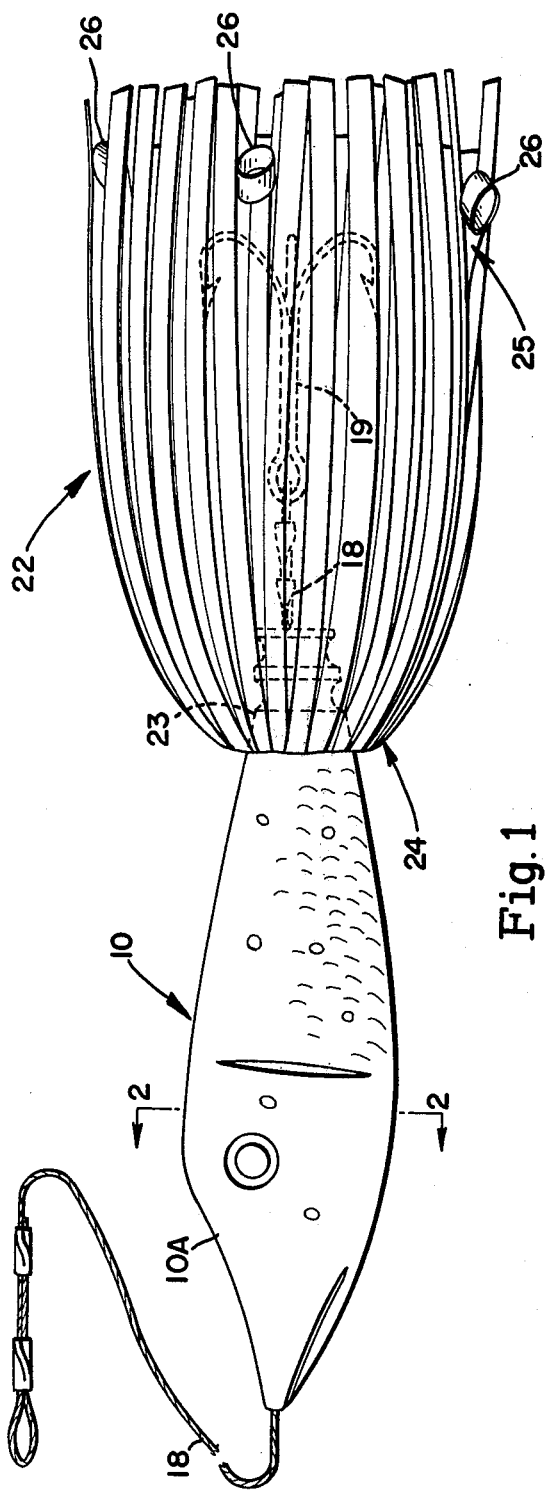
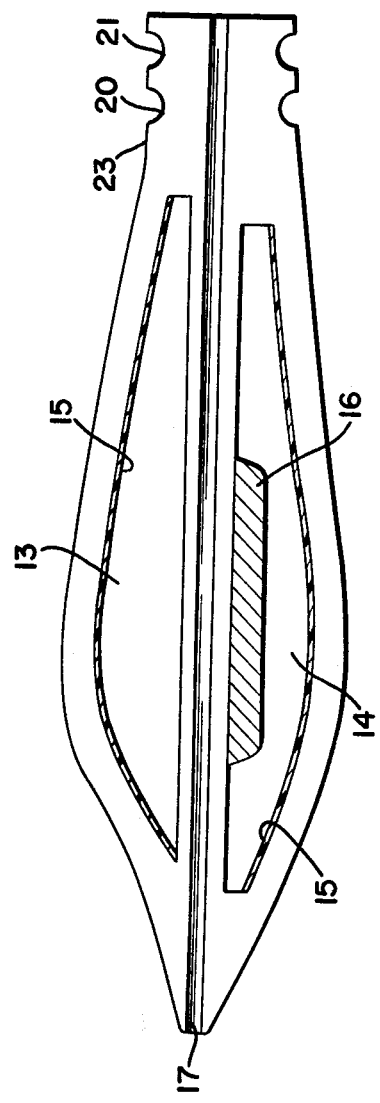
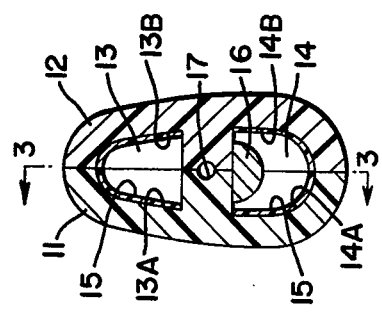

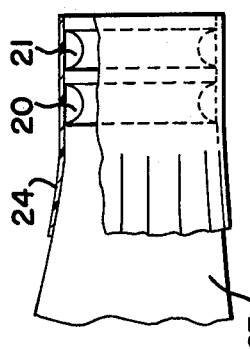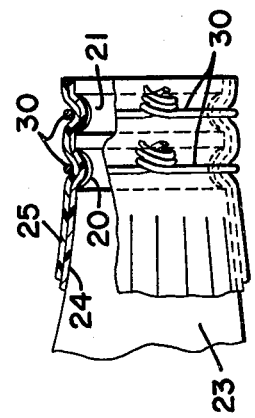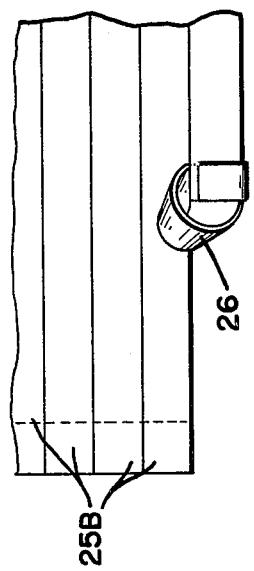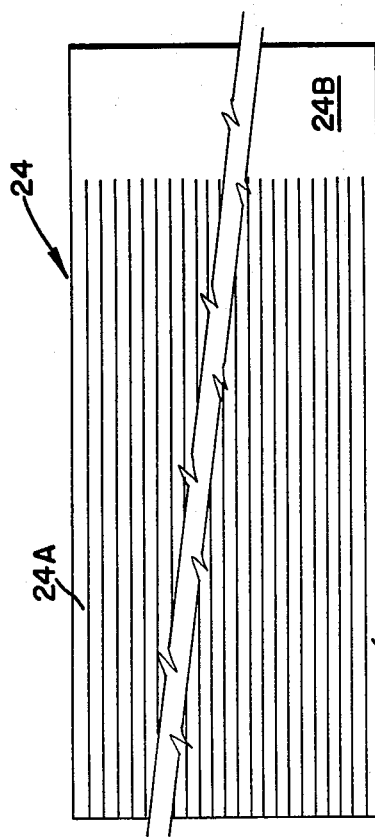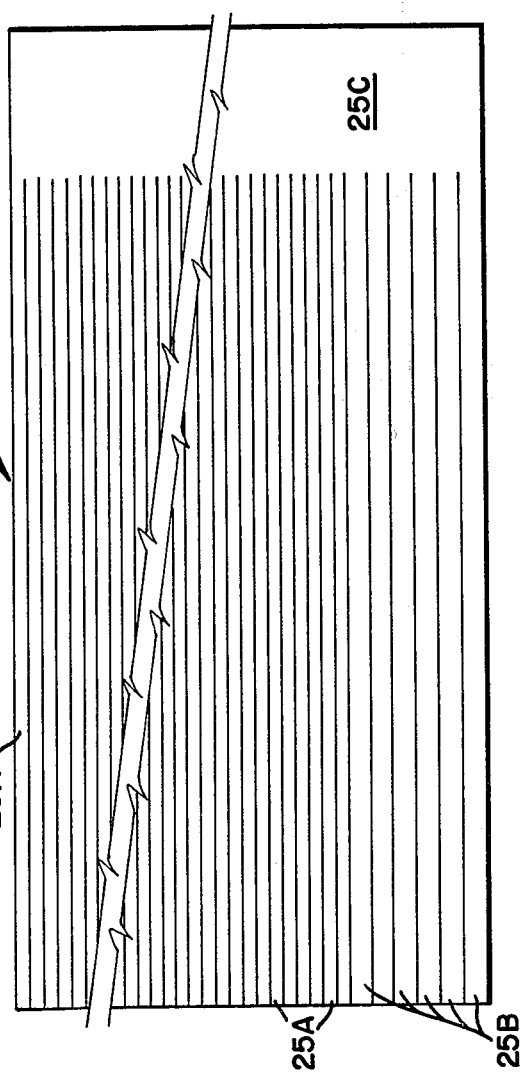

TROLLING LURE AND METHOD OF MAKING SAME

Technical Field

My invention relates to fishing trolling lures.

Trolling lures must have fish attention getting aspects of an asthetic nature and motion intrigue to attract large fish.

BACKGROUND ART

Heretofore trolling lures such as S. E. Cressey U.S. Pat. Nos. 1,612,264; K. Ono 1,723,557; W. C. Saunders, Jr. 2,161,094; H. Pokras 2,625,767 have been known which have a head like end and streamer shrouds secured to leader lines which pass through the fish body for connection to a fish line.

The L. J. Gombar U.S. Pat. No. 3,021,632 patent suggests forming streamers or ribbons of metalized plastic sheet film on lures.

DISCLOSURE OF THE INVENTION

In accordance with my invention I provide a plastic lure the clear body of which has cavities which may be lined with spectra film which is reflective and gives the body of the lure a shiny scale like effect. The cavities can also be weighted and a leader opening passed through the body.

My improved lure possesses the advantage that the streamer shroud which will flutter about and conceal the hook is obtained from the use of two skirts, an inner and an outer skirt, one wrapped clockwise and the other wrapped counter clockwise about the rear of the lure body, each anchored to the body by wire. One of the skirts of streamers having streamers broader than others. The broader streamers have squid tips which are formed by looping the free ends of the broad streamers upon and securing them to themselves.

These squid tips due to their frustoconical open ended construction, when passed through the wake of the trolling boat will cause the lure to skip and jump in life like erratic patterns to attract the attention of the game fish being sought.

The object of the invention is to provide a trolling lure with both fish attracting aesthetic effects and motion intrigue to command the desired attention of game fish to compel their pursuit of the lure.

The lure with the aesthetic use of spectra film so resembles to live fish as to compel the attention of a game fish desiring a meal.

The additional use of a muli-skirted streamer shroud of thin plastic mirror film disguising a hook which shroud due to the presence of squid tips on at least some of the streamers on one of the overlying skirts forming the shroud will cause the lure to skip and jump in life like erratic patterns which will command the attention of even the sluggish of the game fish specie when traveling through the trolling wake of a power boat.

Another object of the invention is the method of making and assembling the lure with the overlapping skirt shrouds of streamers secured to the tail of the lure body with clamping wire.

BRIEF DESCRIPTION OF DRAWINGS

FIG. 1 is a side elevational view of a fishing lure in accordance with the present invention showing a hook and a leader therewith.

FIG. 2 is a vertical section through the lure of FIG. 1 at the lines 2—2.

FIG. 3 is a longitudinal vertical section taken on the lines 3—3 of FIG. 2, being the lure of FIG. 1.

FIG. 4 is a plan view of the outer skirt of slit plastic mirror film.

FIG. 5 is a plan view of the inner skirt of slit plastic mirror film.

FIG. 6 is an enlarged perspective view of one of the squid tips formed on the free end of a slit streamer of the inner skirt.

FIG. 7 is an enlarged sectional view of rear end of said fish-like body showing attachment of the outer skirt of plastic mirror film about the annular grooves.

FIG. 8 is a view similar to FIG. 7 with both the inner and outer skirts anchored in place by the wire forcing the skirts into the annular wire tie grooves.

BEST MODE FOR CARRYING OUT THE INVENTION

Referring to FIGS. 1 through 3 of the drawings, 10 represents generally a clear plastic body made up of two complemental plastic members 11, 12 each having an upper cavity 13 and a lower cavity 14. The inner cavity walls 13A, 14A and 13B, 14B are lined with spectra film 15, a reflective material having a fish scale like appearance when viewed through a transparent clear plastic such as the two mold halves 11, 12 from the outside. The spectra film 15 may be coated with a clear pressure sensitive adhesive on its shiny reflective side to cause it to adhere to the cavity walls as shown in FIG. 2. The lower cavity 14 houses a trolling weight or weights 16 to regulate the depth at which the lure will troll through the wake of the boat at optimum trolling speed.

Separating the upper and lower cavities 13, 14, is a central longitudinal opening or bore 17 passing through the plastic body 10 for the passage of a leader wire 18 therethrough. Secured to the other end of the leader wire 18 is a trolling hook 19. Formed at the rear of the body and passing completely thereabout are two wire tie grooves 20, 21.

A hook concealing streamer shroud 22 is secured at the rear or tail 23 of the body. As best seen in FIGS. 4 through 8 the streamer shroud 22 is made up of two skirts of streamers, an inner skirt 24 and an outer skirt 25, one wrapped over the other and both retained on the body 10 by two lengths of smaller diameter stainless steel aircraft wire 30 wrapped about the skirts into the grooves and being lock twisted each upon itself.

Referring now to FIG. 4, the outer skirt 24 is made of thin plastic mirror film incised along its length to form streamers 24A which are connected at 24B.

As shown in FIG. 5, the inner skirt 25 is made of thin plastic mirror film incised along its length to form streamers of uniform width 25A and wider streamers 25B at one edge of the skirt all of which are connected at one end 25C.

The squid tips 26D are formed from six streamers 25B, 5/16" wide on the right side of the inside skirt 25, best seen in FIG. 5. A fold 5/16" in length is made upwardly. The folded end is then curled upwardly and to the right and then back down tucking it under two inches from the tip of the streamer. The folded tip is then glued or cemented on top as shown in FIG. 6. This is done with all the wider streamers 25B.

In attaching the skirts 24, 25 to the rear or tail 23 of the body, the outer skirt 24 is attached first as shown in FIG. 7 about the tail 23 clockwise with the tips of the streamers pointing toward the head 10A. A small drop of glue will secure both the inner and outer skirt until the inner skirt 25 is then attached by wrapping same counterclockwise over the outer skirt, with the squid tips 26D facing in and pointed toward the nose or head 10A of the fish body. As shown in FIG. 8 the skirt retaining wires 30 are wrapped and twisted in place.

The body 10A of the lure may vary as to height, width and length as well as coloration or hue of plastic or even additionally hand painted to be rendered more life like to resemble the preferred bait of the specie of fish being trolled for.

The squid tips 26 are designed to give a life-like swimming activity to the lure which is enhanced when fished near the prop wash of a motorized vessel 5 to 10 meters. Although the squid tips appear to be in a vunerable location on the lure, they will retain an adequate degree of activity upon repeated strikes by large game fish until the skirt is destroyed at which time the lure can be refitted with a new set of skirts.

I claim:

1. A trolling fishing lure comprising:
   (a) a molded plastic transparent fish-like body having a fish head at one end and two annular wire tie grooves at its other end,
   (b) leader wire opening means extending longitudinally through said body, reflective spectra film secured to said body so that when viewed from the outside of said body to resemble fish-like scales,
   (c) trolling weights in the bottom of said body,
   (d) an outer skirt of thin plastic mirror film sheeting slit to provide a plurality of streamers wrapped clockwise about said body about said wire tie grooves,
   (e) an inner skirt of thin plastic mirror film sheeting slit to provide a plurality of streamers some of which are wider in width than others,
   (f) said inner skirt being wrapped counter clockwise over and about said outer skirt,
   (g) squid tip means proximate the free ends of the wider streamers of said inner skirt, and
   (h) both said inner and outer skirts being secured to said fish-like body by a length of wire passed about said skirts twisted upon itself and retaining said skirts between said wire and said annular wire tie grooves on said fish-like body.

2. A trolling fishing lure comprising:
   (a) a molded plastic transparent fish-like body having at least two cavities therein with a fish head at one end and two annular wire tie grooves at its other end,
   (b) leader wire opening means extending longitudinally through said body and lying between said cavities,
   (c) reflective spectra film secured to the inside walls of said two cavities positioned on said walls when viewed from the outside of said body to resemble fish-like scales,
   (d) trolling weights in at least one of said cavities,
   (e) an outer skirt of thin plastic mirror film sheeting slit to provide a plurality of streamers wrapped clockwise about said body about said wire tie grooves,
   (f) an inner skirt of thin plastic mirror film sheeting slit to provide a plurality of streamers some of which are wider in width than others,
   (g) said inner skirt being wrapped counter clockwise over and about said outer skirt,
   (h) squid tip means proximate the free ends of the wider streamers of said inner skirt, and
   (i) both said inner and outer skirts being secured to said fish-like body by a length of wire passed about said skirts twisted upon itself and retaining said skirts between said wire and said annular wire tie grooves on said fish-like body.

3. A lure as claimed in claim 2, wherein said cavities are vertically disposed one above the other in said body.

4. A lure as claimed in claim 2, wherein said outer skirt of plastic mirror film is uniformly slit transversely but not completely slit longitudinally leaving all the streamers connected proximate one end.

5. A lure as claimed in claim 4, wherein said inner skirt of plastic mirror film has a transverse area of uniformly slit transversely but not completely slit streamers and an area of transversely broader streamers at one edge.

6. A lure as claimed in claim 5, wherein said squid tip means are formed on the free ends of the transversely broader streamers of the inner skirt by looping the free end back upon itself as securing the free end to the underside thereof.

7. A lure as claimed in claim 2, wherein the trolling weights are positioned in the lower of the two cavities beneath said leader wire opening means.

8. The method of making a fishing lure comprising:
   (a) forming a two piece plastic body having longitudinally disposed vertically arranged cavities having a leader opening longitudinally through said body, a fish-like head on one end and skirt anchoring grooves at the other end,
   (b) lining the walls of said cavities with spectra film for reflective effect through the transparent plastic body to give a scale like effect,
   (c) adding trolling weights in said cavities,
   (d) forming an outer skirt of a sheet of plastic mirror film sheeting slit along at least a portion of the major portion of its major axis to form streamers,
   (e) attaching said outer skirt to the rear of said body overlying the skirt anchoring grooves with cement so that the free ends of said streamers are directed forwardly toward the head,
   (f) forming an inner skirt of a sheet of plastic mirror film sheeting slit along a portion of the major axis to form streamers some of which are broader than others,
   (g) placing the inner skirt over the outer skirt with the free ends of the streamers directed forwardly toward the head,
   (h) anchoring both said inner and outer skirts to said body by passing a small diameter wire about said skirts and twisting it upon itself to lock the skirts and wires in the skirt anchoring grooves,
   (i) forming squid tips on the free ends of the broader streamers by looping the free ends upon themselves and securing the end of the loop to the streamer, and
   (j) fanning the free ends of the streamers of said inner and outer skirts back over the fish-like body to form a streamer shroud cavity at the rear of the fish within which a hook connected to a leader passing through the body of the fish may be placed during trolling with the lure.

* * * * *